United States Patent [19]
Trent

[11] 4,128,259
[45] Dec. 5, 1978

[54] SWAY LIMITING LINKAGE FOR A VEHICLE

[76] Inventor: Donald Trent, 1050 Clepper La., Batavia, Ohio 45103

[21] Appl. No.: 801,559

[22] Filed: May 31, 1977

[51] Int. Cl.$^2$ ............................................. B60G 19/02
[52] U.S. Cl. ................................................... 280/689
[58] Field of Search ........................ 280/689, 725, 726

[56] References Cited
U.S. PATENT DOCUMENTS 2,770,468  11/1956  Willingham ........................... 280/689

FOREIGN PATENT DOCUMENTS 1079174  5/1953  France ..................................... 280/689

Primary Examiner—Robert R. Song
Attorney, Agent, or Firm—James W. Pearce; Roy F. Schaeperklaus

[57] ABSTRACT

A sway limiting linkage for a vehicle. A pair of lever members is pivotally mounted on running gear of the vehicle. Inner arms of the lever members are connected to swing up and down together. Outer arms of the lever members are linked to body frame members of the vehicle to cause the body frame members to move toward and away from the running gear in unison.

2 Claims, 5 Drawing Figures

U.S. Patent
Dec. 5, 1978
4,128,259
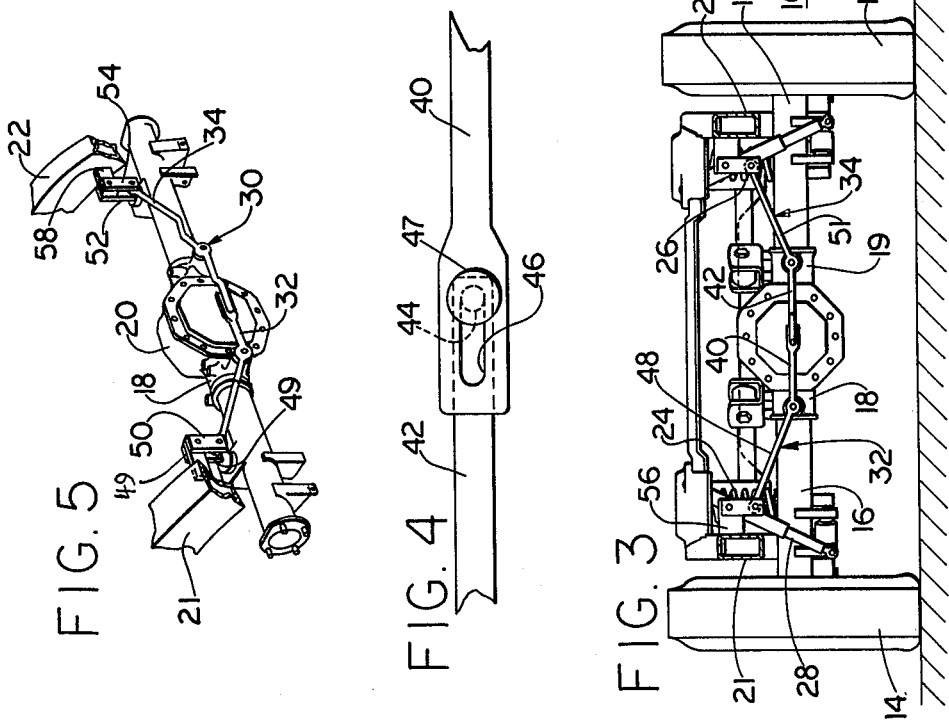
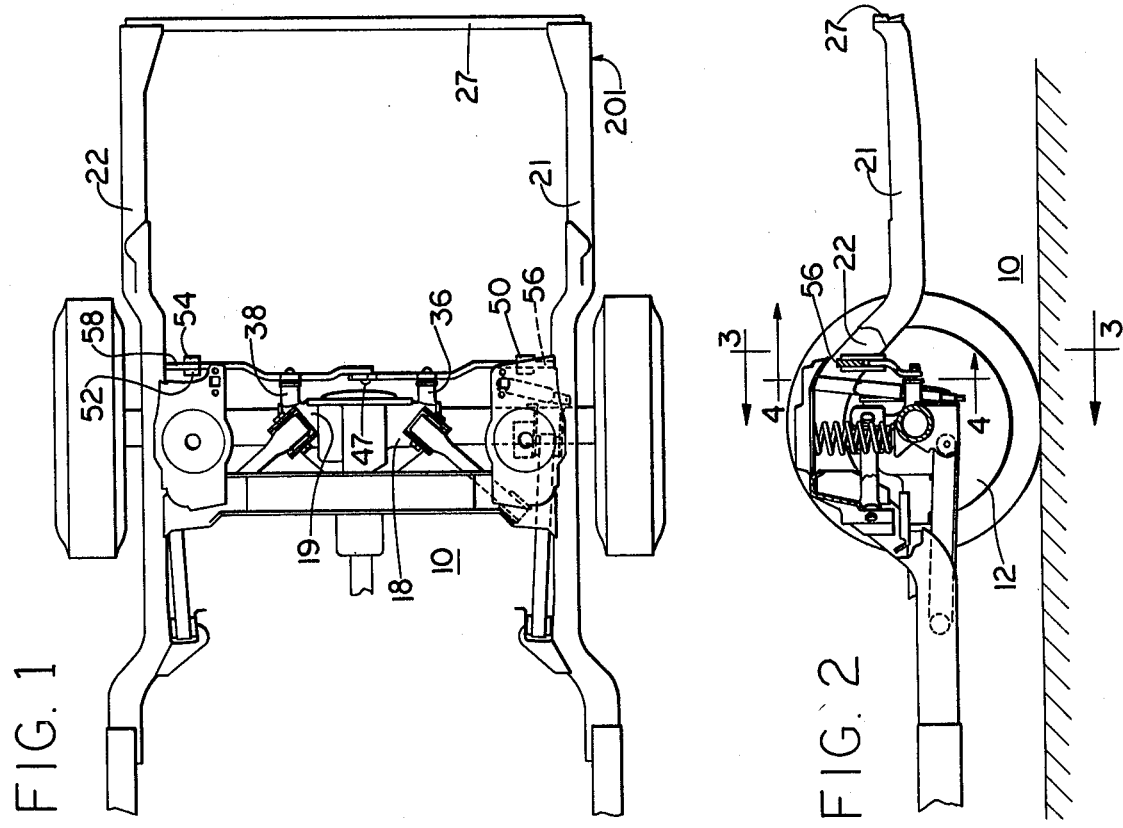

SWAY LIMITING LINKAGE FOR A VEHICLE

This invention relates to a device for stabilizing a vehicle against swaying. More particularly, this invention relates to a linkage which resists side sway of the vehicle as the vehicle goes around a curve.

An object of this invention is to provide a linkage between running gear and a body of a vehicle which mechanically prevents swaying of the body of the vehicle as the vehicle goes around a curve and maintains the body of the vehicle parallel to the running gear.

A further object of this invention is to provide such a linkage which permits up and down movement of the body toward and away from the running gear without swinging or swaying of the body.

Briefly, this invention provides a linkage which includes lever members mounted on running gear of a vehicle opposite sides of a center thereof. Inner end portions of the lever members are connected to swing up and down together. Outer end portions of the lever members are linked to body frames outboard of the pivots thereof. The linkage permits the body frame to move up and down relative to the running gear but prevents swinging of the body frame with respect to the running gear.

The above and other objects and features of the invention will be apparent to those skilled in the art to which this invention pertains from the following detailed description and the drawings, in which:

FIG. 1 is a fragmentary plan view of a vehicle with the body of the vehicle removed, which incorporates a linkage constructed in accordance with an embodiment of this invention, a portion of a frame of the body being shown therewith;

FIG. 2 is a view in side elevation, partly broken away and in section, of the vehicle portion shown in FIG. 1;

FIG. 3 is a view in section taken on the line 3—3 in FIG. 2;

FIG. 4 is a fragmentary view on an enlarged scale looking in the direction of the arrows 4—4 in FIG. 2; and FIG. 5 is a perspective view showing the stabilizing linkage and associated parts of the vehicle.

In the following detailed description and the drawing, like reference characters indicate like parts.

In FIGS. 1-3 inclusive is shown a fragmentary portion 10 of the running gear of a vehicle which includes right and left rear wheel and tire assemblies 12 and 14. The wheel and tire assemblies 12 and 14 are rotatably mounted at ends of frame tubes 16 and 17 in the usual manner. The frame tubes 16 and 17 are attached to extensions 18 and 19 of a differential housing 20. The differential housing 20 encloses gearing (not shown) that drives the rear wheel and tire assemblies. A body frame 201 including a left body frame member 21 and a right body frame member 22 is supported above the frame tubes 16 and 17 by appropriate springs 24 and 26. The body frame members 21 and 22 are spanned by appropriate cross frames, one of which is indicated at 27. The body frame members 21 and 22 can support a conventional automobile body (not shown) in usual fashion. Appropriate shock absorbers 28 and other support members are provided in association with the running gear and the body frame 201 in a conventional manner.

Side sway of the body frame members 21 and 22 is limited by a sway preventing linkage 30. The linkage 30 includes lever members 32 and 34, which are pivotally mounted on lugs 36 and 38, respectively. The lugs 36 and 38 are carried by the extensions 18 and 19, respectively, of the differential housing 20 with the pivots of the lever members 32 and 34 being on opposite sides of the differential housing 20 and equally spaced on opposite sides of a center line of the running gear of the vehicle. Inner arms 40 and 42 of the lever members 32 and 34, respectively, are connected by a pin member 44. The pin member 44 is mounted in the arm 42 and moves in a lengthwise slot 46 in the arm 40 so that the end portions of the inner arms 40 and 42 move up and down together. A head 47 on the pin 44 holds the inner arms 40 and 42 in assembled relation. An outer end portion of an outer arm 48 of the lever member 32 is pivotally connected to links 49 and 50, and an outer end portion of an outer arm 51 of the lever member 34 is pivotally connected to links 52 and 54. The links 49 and 50 are pivotally connected to a strut 56. The strut 56 is firmly attached to the body left frame member 21. Similarly, the links 52 and 54 are pivotally connected to a strut 58, which is firmly attached to the body right frame member 22. The outer arms 48 and 51 are of equal length. The links 49–50 and 52–54 are of equal length.

The linkage 30 permits the body frame to move up and down with respect to the running gear. However, if one side of the body frame tends to move downwardly or upwardly without the other side, as when the vehicle goes around a curve, the linkage causes both sides of the body frame to move upwardly and downwardly together.

The sway preventing linkage illustrated in the drawing and described above is subject to structural modification without departing from the spirit and scope of the appended claims.

Having described my invention, what I claim as new and desire to secure by letters patent is:

1. A sway limiting linkage for a vehicle which comprises a pair of lever members, pivot means for the lever members pivotally mounted on running gear of the vehicle on opposite sides of a center line thereof, means connecting inner arms of the lever members to swing up and down together, the means connecting inner arms of the lever members including a pin mounted on one of said inner arms and a lengthwise slot in the other of said inner arms receiving said pin, and means linking outer arms of the lever members to body frame members of the vehicle to cause the body frame members to move toward and away from the running gear in unison.

2. A sway limiting linkage as in claim 1 wherein the pivot means for the lever members are equally spaced on opposite sides of a center line of the running gear and the outer arms are of equal length so that the body frames move equal distances toward and away from the running gear.

* * * * *